United States Patent
Vlad et al.

(10) Patent No.: US 12,399,484 B2
(45) Date of Patent: Aug. 26, 2025

(54) SELECTIVE INVOCATION OF RPA WORKFLOWS VIA API CALLS

(71) Applicant: UiPath Inc., New York, NY (US)

(72) Inventors: George C Vlad, Bucharest (RO); Ion Mincu, Corbeanca (RO); Andrei L Ungureanu, Bucharest (RO); Eduard Stanculet, Bucharest (RO)

(73) Assignee: UiPath Inc., New York, NY (US)

( * ) Notice: Subject to any disclaimer, the term of this patent is extended or adjusted under 35 U.S.C. 154(b) by 443 days.

(21) Appl. No.: 18/159,707

(22) Filed: Jan. 26, 2023

(65) Prior Publication Data

US 2024/0255920 A1    Aug. 1, 2024

(51) Int. Cl.
  *G05B 19/4155* (2006.01)
  *G06F 9/54* (2006.01)

(52) U.S. Cl.
  CPC ......... *G05B 19/4155* (2013.01); *G06F 9/547* (2013.01); *G05B 2219/50391* (2013.01)

(58) Field of Classification Search
  CPC ...... G05B 19/4155; G05B 2219/50391; G06F 9/547; G06F 9/541
  See application file for complete search history.

(56) References Cited

U.S. PATENT DOCUMENTS

| | | | |
|---|---|---|---|
| 9,696,971 B1 | 7/2017 | Wierda | |
| 2006/0074730 A1* | 4/2006 | Shukla | G06Q 10/0633 705/7.26 |
| 2017/0001308 A1* | 1/2017 | Bataller | B25J 9/1679 |
| 2018/0197123 A1* | 7/2018 | Parimelazhagan | G06Q 10/0633 |
| 2018/0321922 A1* | 11/2018 | Balasubramanian | H04L 51/02 |
| 2018/0357094 A1 | 12/2018 | Kim | |
| 2020/0089478 A1* | 3/2020 | Nelson | G06F 8/34 |
| 2021/0191367 A1* | 6/2021 | Iyer | B25J 9/1605 |

(Continued)

OTHER PUBLICATIONS

Commvault, "Executing a Workflow as an API (REST API:GET)," https://documentation.commvault.com/v11/essential/49452_executing_workflow_as_api_rest_api_get.html, Apr. 20, 2020.

(Continued)

*Primary Examiner* — Brian W Wathen
(74) *Attorney, Agent, or Firm* — Law of Andrei D Popovici, PC

(57) ABSTRACT

In some embodiments, a robotic process automation (RPA) design interface enables a user to select an RPA workflow forming a part of a complex RPA project, and define the selected workflow as a distinct executable entity that can be invoked remotely via an API call (e.g., HTTP request) issued to an RPA conductor orchestrating the execution of multiple RPA robots. The RPA design interface enables the user to customize a set of API call parameters (e.g., HTTP method, URI, input and/or output arguments) for invoking the respective RPA workflow. The user-defined, workflow-specific API call parameter values may then be transmitted to the RPA conductor, for instance as metadata attached to a specification of the RPA project. In turn, the RPA conductor automatically generates an API specification (e.g., OpenAPI or Swagger™) for the workflow fragment. In response to receiving an API call configured with the respective workflow-specific call parameter values, the RPA conductor selectively triggers execution of the selected RPA workflow on a selected RPA robot.

17 Claims, 10 Drawing Sheets

(56) References Cited

U.S. PATENT DOCUMENTS

2022/0027806 A1* 1/2022 Burman .......... G06Q 10/06316
2022/0327006 A1 10/2022 Makhija

OTHER PUBLICATIONS

DOTCMS, "Workflow REST API," https://www.dotcms.com/docs/latest/workflow-rest-api, Jan. 28, 2021.
safe.com, "Automating Workflow Submission from a Third Party Application to FME Server," https://community.safe.com/s/article/Running-Workflows-from-a-Third-Party-Application, Feb. 6, 2023.

* cited by examiner

```
                  ┌─ 61              63
                  ▼         ╭─────────────────────────────────╮
POST   /api/rest/Operational/AccountingLedger/Customers   HTTP/1.1

User-Agent: Mozilla/4.0 (compatible; MSIE5.01; Windows NT)
Content-Type: application/json
Accept-Language: en-us
Accept-Encoding: gzip, deflate
cache-control: no-cache, no-store
Connection: Keep-Alive
access-control-allow-credential: true ⎧ {
      ⎪         "Name":      "Cosmin",
   65 ⎨         "Surname":   "Vlad",
      ⎪         "email":     "APItesting@uipath.com"
      ⎩ }                                                      60
```

FIG. 6

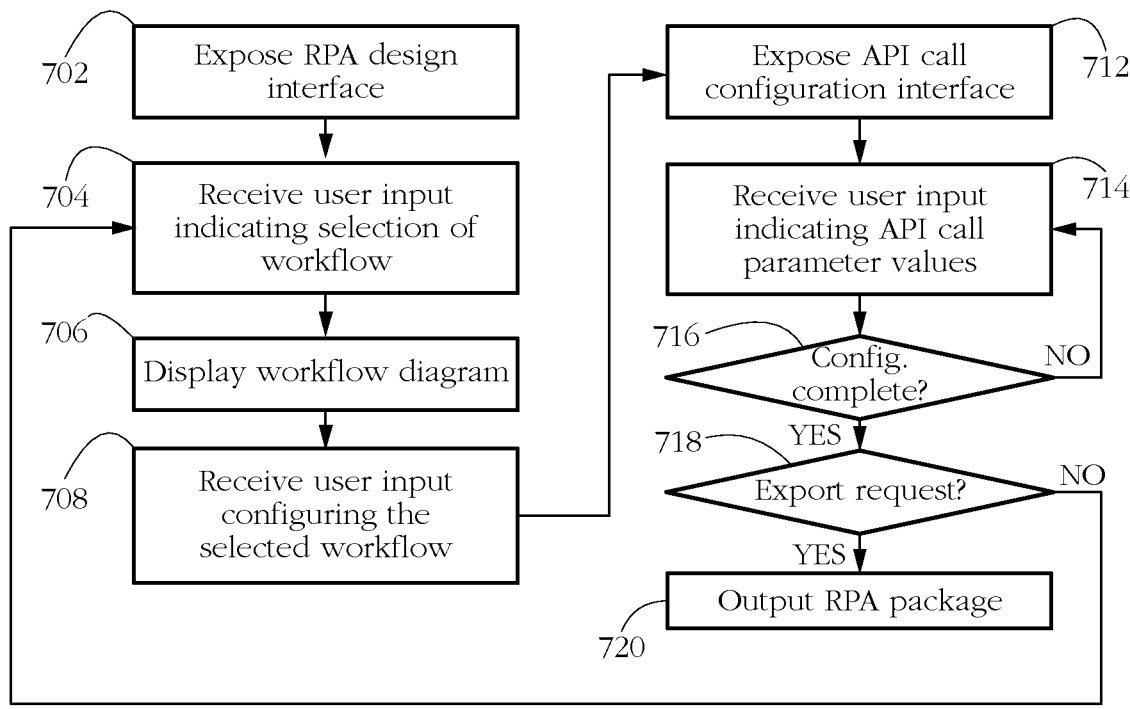

FIG. 7

SELECTIVE INVOCATION OF RPA WORKFLOWS VIA API CALLS

BACKGROUND OF THE INVENTION

The invention relates to robotic process automation (RPA), and in particular to facilitating the development and use of RPA software.

RPA is an emerging field of information technology aimed at improving productivity by automating repetitive computing tasks, thus freeing human operators to perform more intellectually sophisticated and/or creative activities. Notable tasks targeted for automation include extracting structured data from documents and interacting with user interfaces, for instance filling forms, among others.

Complex RPA projects may come with specific challenges. The design of automations is generally carried out by specialized RPA developers, which often differ from the clients who ultimately use the respective automations. Therefore, the maintenance and occasional customization of RPA products and solutions may involve multiple parties, making them relatively slow and costly. Some clients may depend on legacy software such as various enterprise resource planning (ERP) programs and services, some of which may require specialized knowledge to operate, and which may be hard to adapt to a user's specific needs. Furthermore, typical automation solutions and services are tailored to specific tasks and environments, and cannot be easily reused, repurposed, or reconfigured.

A distinct prong of RPA development is directed at simplifying the programming and management of software robots and automations, with the ultimate goal of extending the reach of RPA technology to 'citizen developers', i.e., users that lack advanced programming skills or specialized training. There is therefore a strong interest in making all aspects of RPA more user-friendly and intuitive, to attract a broad audience of developers and users.

SUMMARY OF THE INVENTION

According to one aspect, a computer system comprises at least one hardware processor configured to execute a robotic process automation (RPA) design application configured to receive a user input choosing an RPA workflow for selective execution from a plurality of workflows of an RPA project, the RPA workflow comprising a user-defined sequence of robotic activities. The RPA design application is further configured, in response to the user input, to formulate an RPA package comprising a specification of the plurality of workflows, the RPA package formulated to include metadata encoding a set of user-defined application programming interface (API) call parameter values for configuring an API call which, when received by an RPA conductor configured to coordinate a set of RPA robots, causes the RPA conductor to selectively trigger an execution of the RPA workflow by an RPA robot of the set of RPA robots. The RPA design application is further configured to transmit the RPA package to the RPA conductor.

According to another aspect, a method comprises employing at least one hardware processor of a computer system to execute an RPA design application. Executing the RPA design application comprises receiving a user input choosing an RPA workflow for selective execution from a plurality of workflows of an RPA project, the RPA workflow comprising a user-defined sequence of robotic activities. Executing the RPA design application further comprises, in response to the user input, formulating an RPA package comprising a specification of the plurality of workflows, the RPA package formulated to include metadata encoding a set of user-defined API call parameter values for configuring an API call which, when received by an RPA conductor configured to coordinate a set of RPA robots, causes the RPA conductor to selectively trigger an execution of the RPA workflow by an RPA robot of the set of RPA robots. Executing the RPA design application further comprises transmitting the RPA package to the RPA conductor.

According to another aspect, a non-transitory computer readable medium stores instructions which, when executed by at least one hardware processor of a computer system, cause the computer system to form an RPA design application. The RPA design application is configured to receive a user input choosing an RPA workflow for selective execution from a plurality of workflows of an RPA project, the RPA workflow comprising a user-defined sequence of robotic activities. The RPA design application is further configured, in response to the user input, to formulate an RPA package comprising a specification of the plurality of workflows, the RPA package formulated to include metadata encoding a set of user-defined API call parameter values for configuring an API call which, when received by an RPA conductor configured to coordinate a set of RPA robots, causes the RPA conductor to selectively trigger an execution of the RPA workflow by an RPA robot of the set of RPA robots. The RPA design application is further configured to transmit the RPA package to the RPA conductor.

BRIEF DESCRIPTION OF DRAWINGS

The foregoing aspects and advantages of the present invention will become better understood upon reading the following detailed description and upon reference to the drawings where:

FIG. 6 shows an exemplary application programming interface (API) call according to some embodiments of the present invention.

FIG. 7 shows an exemplary sequence of steps performed by an RPA design application according to some embodiments of the present invention.

DETAILED DESCRIPTION OF THE INVENTION

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g., data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized, searchable collection of data. Computer-readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
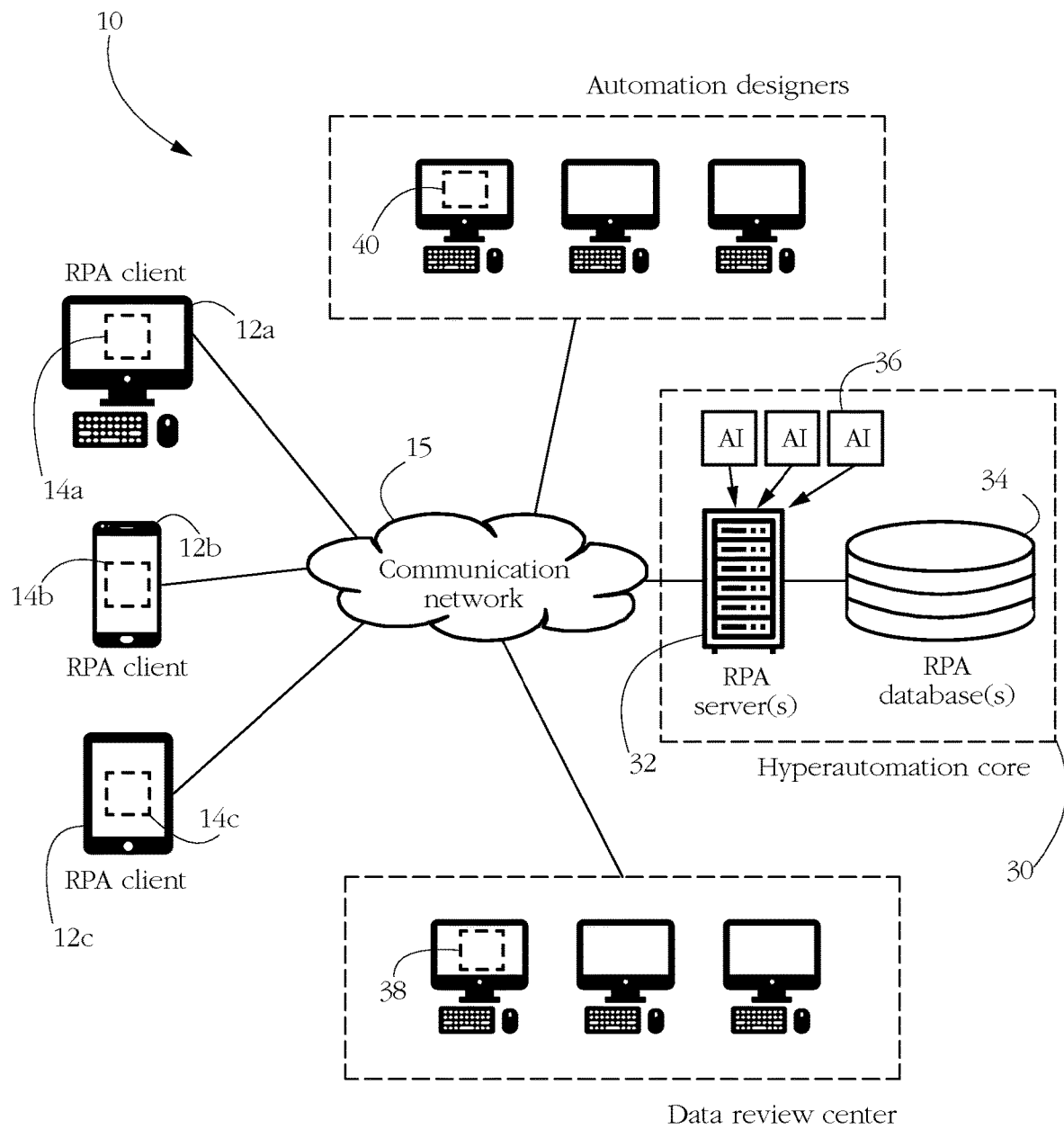
FIG. 1 shows an architectural diagram of a hyper-automation system according to some embodiments of the present invention.

FIG. 1 is an architectural diagram illustrating a hyper-automation system 10 according to some embodiments of the present invention. 'Hyper-automation' as used herein refers to automation systems that bring together components of robotic process automation, integration tools, and technologies that amplify the ability to automate work. In an exemplary robotic process automation scenario, an employee of a company uses a business application (e.g., word processor, spreadsheet editor, browser, email application) to perform a repetitive task, for instance to issue invoices to various clients. To carry out the respective task, the employee performs a sequence of operations/actions, which is herein deemed a work process. Exemplary operations forming a part of an invoice-issuing work process may include opening a Microsoft Excel® spreadsheet, looking up company details of a client, copying the respective details into an invoice template, filling out invoice fields indicating the purchased items, switching over to an email application, composing an email message to the respective client, attaching the newly created invoice to the respective email message, and clicking a 'Send' button. Various elements of system 10 may collaborate to automate the respective work process by mimicking the set of operations performed by the respective human operator in the course of carrying out the respective task. Mimicking a human operation/action is herein understood to encompass reproducing the sequence of computing events that occur when a human operator performs the respective operation/action on the computer, as well as reproducing a result of the human operator's performing the respective operation on the computer. For instance, mimicking an action of clicking a button of a graphical user interface (GUI) may comprise having the operating system move the mouse pointer to the respective button and generating a mouse click event, or may alternatively comprise toggling the respective GUI button itself to a clicked state.

Exemplary processes targeted for RPA include processing of payments, invoicing, communicating with business clients (e.g., distribution of newsletters and/or product offerings), internal communication (e.g., memos, scheduling of meetings and/or tasks), auditing, and payroll processing, among others.

RPA may constitute the core of hyper-automation system 10, and in certain embodiments, automation capabilities may be expanded with artificial intelligence (AI)/machine learning (ML), process mining, analytics, and/or other advanced tools. As hyper-automation system 10 learns processes, trains AI/IL models, and employs analytics, for example, more and more knowledge work may be automated, and computing systems in an organization, e.g., both those used by individuals and those that run autonomously, may all be engaged to be participants in the hyper-automation process. Hyper-automation systems of some embodiments allow users and organizations to efficiently and effectively discover, understand, and scale automations.

Exemplary hyper-automation system 10 includes RPA client computing systems 12a-c, such as a desktop computer, tablet computer, and smart phone, among others. Any desired client computing system may be used without deviating from the scope of the invention including, but not limited to, smart watches, laptop computers, servers, Internet-of-Things (IoT) devices, etc. Also, while FIG. 1 shows only three client computing systems 12a-c, any suitable number of client computing systems may be used without deviating from the scope of the invention. For instance, in some embodiments, dozens, hundreds, thousands, or millions of client computing systems may be used. Client computing systems 12a-c may be actively used by a user or run automatically without much or any user input.

Each illustrated client computing system 12a-c has respective automation module(s) 14a-c running thereon. Exemplary automation module(s) 14a-c may include, but are not limited to, RPA robots, parts of an operating system, downloadable application(s) for the respective computing system, any other suitable software and/or hardware, or any combination of these without deviating from the scope of the invention.

In some embodiments, one or more of module(s) 14a-c may be listeners. Listeners monitor and record data pertaining to user interactions with respective computing systems and/or operations of unattended computing systems and send the data to a hyper-automation core system 30 via a communication network 15 (e.g., a local area network-LAN, a mobile communications network, a satellite communications network, the Internet, any combination thereof, etc.). The data may include, but is not limited to, which buttons were clicked, where a mouse was moved, the text that was entered in a field, that one window was minimized and another was opened, the application associated with a window, etc. In certain embodiments, the data from such listener processes may be sent periodically as part of a heartbeat message, or in response to a fulfillment of a data accumulation condition. One or more RPA servers 32 receive and store data from the listeners in a database, such as RPA database(s) 34 in FIG. 1.

Other exemplary automation module(s) 14a-c may execute the logic that actually implements the automation of a selected process. Stated otherwise, at least one automation module 14a-c may comprise a part of an RPA robot as further described below. Robots may be attended (i.e., requiring human intervention) or unattended. In some embodiments, multiple modules 14a-c or computing systems may participate in executing the logic of an automation. Some automations may orchestrate multiple modules 14a-c, may carry out various background processes and/or may perform Application Programming Interface (API) calls. Some robotic activities may cause a module 14a-c to wait for a selected task to be completed (possibly by another entity or automation module) before resuming the current workflow.

In some embodiments, hyper-automation core system 30 may run a conductor application on one or more servers, such as RPA server(s) 32. While FIG. 1 shows only one RPA server 32, multiple or many servers that are proximate to one another or in a distributed architecture may be employed without deviating from the scope of the invention. For instance, one or more of RPA server(s) 32 may be provided for conductor functionality, AI/ML model serving, authentication, governance, and or any other suitable functionality without deviating from the scope of the invention. In some embodiments, hyper-automation core system 30 may incorporate or be part of a public cloud architecture, a private cloud architecture, a hybrid cloud architecture, etc. In certain embodiments, hyper-automation core system 30 may host multiple software-based servers on one or more computing systems, such as RPA server(s) 32. In some embodiments, one or more servers of core hyper-automation system 30, such as RPA server(s) 32, may be implemented via one or more virtual machines (VMs).

In some embodiments, one or more of automation modules 14a-c may call one or more AI/ML models 36 deployed on or accessible by hyper-automation core 30. AI/ML models 36 may be trained for any suitable purpose without deviating from the scope of the invention. Two or more of AI/ML models 36 may be chained in some embodiments (e.g., in series, in parallel, or a combination thereof) such that they collectively provide collaborative output(s). Exemplary AI/ML models 36 may perform or assist with computer vision (CV), optical character recognition (OCR), document processing and/or understanding, semantic learning and/or analysis, analytical predictions, process discovery, task mining, testing, automatic RPA workflow generation, sequence extraction, clustering detection, audio-to-text translation, any combination thereof, etc. However, any desired number and/or type(s) of AI/ML models 36 may be used without deviating from the scope of the invention. Using multiple AI/ML models 36 may allow the system to develop a global picture of what is happening on a given computing system, for example. For instance, one AI/ML model could perform OCR, another could detect buttons, another could compare sequences, etc. Patterns may be determined individually by an AI/ML model or collectively by multiple AI/ML models. In certain embodiments, one or more AI/ML models 36 are deployed locally on at least one of RPA client computing systems 12a-c.

Hyper-automation system 10 may provide at least four main groups of functionality: (1) discovery; (2) building automations; (3) management; and (4) engagement. The discovery functionality may discover and provide automatic recommendations for different opportunities of automations of business processes. Such functionality may be implemented by one or more servers, such as RPA server 32. The discovery functionality may include providing an automation hub, process mining, task mining, and/or task capture in some embodiments.

The automation hub (e.g., UiPath Automation Hub™) may provide a mechanism for managing automation rollout with visibility and control. Automation ideas may be crowd-sourced from employees via a submission form, for example. Feasibility and return on investment (ROI) calculations for automating these ideas may be provided, documentation for future automations may be collected, and collaboration may be provided to get from automation discovery to build-out faster.

Process mining (e.g., via UiPath Automation Cloud™ and/or UiPath AI Center™) refers to the process of gathering and analyzing the data from applications (e.g., enterprise resource planning (ERP) applications, customer relation management (CRM) applications, email applications, call center applications, etc.) to identify what end-to-end processes exist in an organization and how to automate them effectively, as well as indicate what the impact of the automation will be. This data may be gleaned from RPA clients 12a-c by listeners, for example, and processed by RPA server(s) 32. One or more AI/ML models 36 may be employed for this purpose. This information may be exported to the automation hub to speed up implementation and avoid manual information transfer. The goal of process mining may be to increase business value by automating processes within an organization. Some examples of process mining goals include, but are not limited to, increasing profit, improving customer satisfaction, regulatory and/or contractual compliance, improving employee efficiency, etc.

Task mining (e.g., via UiPath Automation Cloud™ and/or UiPath AI Center™) identifies and aggregates workflows (e.g., employee workflows), and then applies AI to expose patterns and variations in day-to-day tasks, scoring such tasks for ease of automation and potential savings (e.g., time and/or cost savings). One or more AI/MIL models 36 may be employed to uncover recurring task patterns in the data. Repetitive tasks that are ripe for automation may then be identified. This information may initially be provided by listener modules (e.g., automation modules 14a-c) and analyzed on servers of hyper-automation core 30. The findings from task mining process may be exported to process documents or to an RPA design application such as UiPath Studio™ to create and deploy automations more rapidly.

Task mining in some embodiments may include taking screenshots with user actions (e.g., mouse click locations, keyboard inputs, application windows and graphical elements the user was interacting with, timestamps for the interactions, etc.), collecting statistical data (e.g., execution time, number of actions, text entries, etc.), editing and annotating screenshots, specifying types of actions to be recorded, etc.

Task capture (e.g., via UiPath Automation Cloud™ and/or UiPath AI Center™) automatically documents attended processes as users work or provides a framework for unattended processes. Such documentation may include desired tasks to automate in the form of process definition documents (PDDs), skeletal workflows, capturing actions for each part of a process, recording user actions and automatically generating a comprehensive workflow diagram including the details about each step, Microsoft Word® documents, XAML files, and the like. Build-ready workflows may be exported directly to an RPA design application, such as UiPath Studio™. Task capture may simplify the requirements gathering process for both subject matter experts explaining a process and Center of Excellence (CoE) members providing production-grade automations.

The automation building functionality of hyper-automation system 10 may be accomplished via a computer program, illustrated as an RPA design application 40 in FIG. 1. Examples include UiPath Studio™, UiPath StudioX™, or UiPath Web™, among others. Such computer programs may be used to build and test automations for various applications and environments, such as web, mobile, SAP®, and virtualized desktops. In some embodiments, RPA design application 40 enables a human developer to design a workflow that effectively automates a target work process. A workflow typically comprises a sequence of custom automation steps, herein deemed RPA activities. Each activity includes at least one action performed by the robot, such as clicking a button, reading a file, writing to a spreadsheet cell, etc. Activities may be nested and/or embedded. In some embodiments, RPA design application 40 exposes a design interface and set of tools that give the developer control of the execution order and the relationship between activities of a workflow. In some embodiments, predefined activities, drag-and-drop modeling, and a workflow recorder may make automation easier with minimal coding. Document understanding functionality may be provided by AI activities for data extraction and interpretation that call one or more AI/ML models 36. Such automations may process virtually any document type and format, including tables, webpages, forms, signatures, and handwriting.

RPA design application 40 may also be used to seamlessly combine user interface (UI) automation with API automation, for example to provide API integration with various other applications, technologies, and platforms. A repository (e.g., UiPath Object Repository™) or marketplace (e.g., UiPath Marketplace™) for pre-built RPA and AI templates and solutions may be provided to allow developers to automate a wide variety of processes more quickly. Thus, when building automations, hyper-automation system 10 may provide user interfaces, development environments, API integration, pre-built and/or custom-built AI/ML models, development templates, integrated development environments (IDEs), and advanced AI capabilities. Hyper-automation system 10 may further enable deployment, management, configuration, monitoring, debugging, and maintenance of RPA robots for carrying out the automations designed using application 40.

The management functionality of hyper-automation system 10 may provide deployment, orchestration, test management, AI functionality, and optimization of automations across an organization. Other exemplary aspects of management functionality include DevOps activities such as continuous integration and continuous deployment of automations. Management functionality may also act as an integration point with third-party solutions and applications for automation applications and/or RPA robots.

As an example of management functionality, a conductor application or service may facilitate provisioning, deployment, configuration, queuing, monitoring, logging, and interconnectivity of RPA robots, among others. Examples of such conductor applications/services include UiPath Orchestrator™ (which may be provided as part of the UiPath Automation Cloud™ or on premises, inside a virtual machine, or as a cloud-native single container suite via UiPath Automation Suite™). A test suite of applications/services (e.g., UiPath Test Suite™) may further provide test management to monitor the quality of deployed automations. The test suite may facilitate test planning and execution, meeting of requirements, and defect traceability. The test suite may include comprehensive test reporting.

Analytics software (e.g., UiPath Insights™) may track, measure, and manage the performance of deployed automations. The analytics software may align automation operations with specific key performance indicators (KPIs) and strategic outcomes for an organization. The analytics software may present results in a dashboard format for better understanding by human users.

AI management functionality may be provided by an AI center (e.g., UiPath AI Center™), which facilitates incorporation of AI/ML models into automations. Pre-built AI/ML models, model templates, and various deployment options may make such functionality accessible even to those who are not data scientists. Deployed automations (e.g., RPA robots) may call AI/ML models 36 from the AI center. Performance of the A/I/L models may be monitored. Models 36 may be trained and improved using human-validated data, such as that provided by a data review center as illustrated in FIG. 1. Human reviewers may provide labeled data (e.g., a training corpus) to hyper-automation core 30 via a review application 38 executing on a computer connected to network 15. Reviewers may also use application 38 to validate that predictions by AI/ML models 36 are accurate, and provide corrections otherwise. This dynamic input may then be saved as training data for retraining AI/ML models 36, and may be stored in a database such as RPA database 34, for example. The AI center may schedule and execute training jobs to train the new versions of AI/ML models 36 using the training data.

The engagement functionality of hyper-automation system 10 engages humans and automations as one team for seamless collaboration on desired processes. Low-code applications may be built (e.g., via UiPath Apps™) to connect to browser and legacy software. Applications may be created quickly using a web browser through a rich library of drag-and-drop controls, for instance. An application can be connected to a single automation or multiple automations. An action center (e.g., UiPath Action Center™) may provide a mechanism to hand off processes from robots to humans, and vice versa. Humans may provide approvals or escalations, make exceptions, etc. RPA robots may then perform the automatic functionality of a given workflow.

A local assistant may be provided as a launchpad for users to launch automations (e.g., UiPath Assistant™). This functionality may be provided in a tray provided by an operating system, for example, and may allow users to interact with RPA robots and RPA robot-powered applications on their computing systems. An interface may list automations/workflows approved for a given user and allow the user to run them. These may include ready-to-go automations from an automation marketplace, an internal automation store in an automation hub, etc. When automations run, they may run as a local instance in parallel with other processes on the computing system so users can use the computing system while the automation performs its actions. In certain embodiments, the assistant is integrated with the task capture functionality such that users can document their soon-to-be-automated processes from the assistant launchpad.

In another exemplary engagement functionality, Chatbots (e.g., UiPath Chatbots™), social messaging applications, and/or voice commands may enable users to run automations. This may simplify access to information, tools, and resources users need to interact with customers or perform other activities. For instance, a chatbot may respond to a command formulated in a natural language by triggering a robot configured to perform operations such as checking an order status, posting data in a CRM, etc.

In some embodiments, some functionality of hyper-automation system 10 may be provided iteratively and/or recursively. Processes can be discovered, automations can be built, tested, and deployed, performance may be measured, use of the automations may readily be provided to users, feedback may be obtained, AI/ML models may be trained and retrained, and the process may repeat itself. This facilitates a more robust and effective suite of automations.

Figure 2:
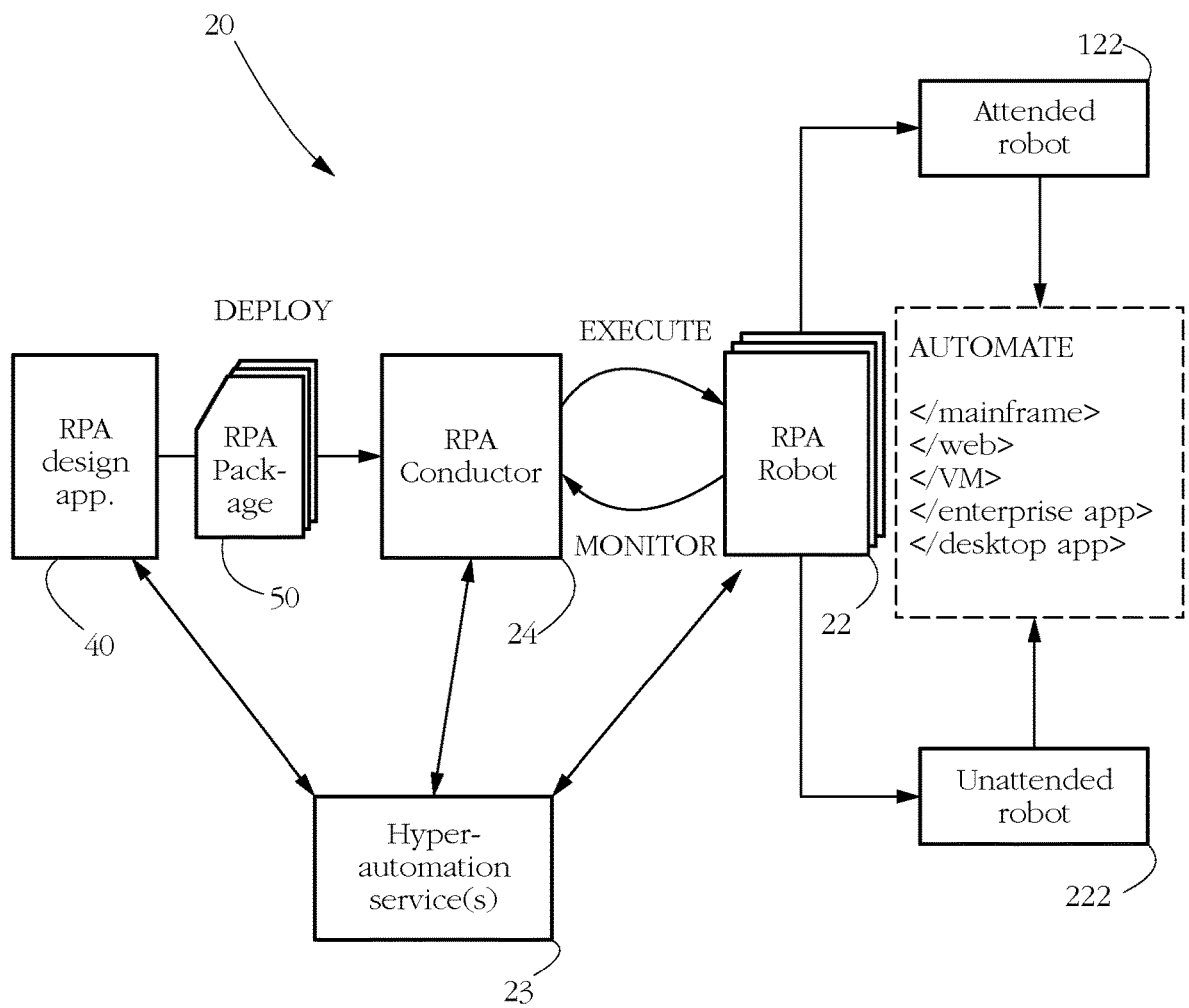
FIG. 2 illustrates an exemplary RPA system according to some embodiments of the present invention.

FIG. 2 illustrates exemplary components and operation of an RPA system 20 according to some embodiments of the present invention. RPA system 20 may form a part of hyper-automation system 10 of FIG. 1. RPA system 20 includes an RPA design application 40 that enables a developer to build automations, i.e., design and implement RPA workflows. For instance, application 40 may expose a user interface and set of tools that give the developer control of the execution order and the relationship between activities of a workflow. One commercial example of RPA design application 40 is UiPath Studio™.

Some types of RPA workflows may include, but are not limited to, sequences, flowcharts, finite state machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed, it may be encoded in computer-readable form, such as an RPA script or an RPA package 50 (FIG. 2). An RPA script comprises a specification of the respective workflow, the specification comprehensible to (or interpretable by) RPA robot 22. RPA scripts may be formulated according to any data specification format known in the art, for instance in a version of an extensible markup language (XML), Javascript Object Notation (JSON), or a programming language such as C#, Visual Basic, Java, etc. Alternatively, RPA scripts may be formulated in an RPA-specific version of bytecode, or even as a sequence of instructions formulated in a natural language such as English, Spanish, Japanese, etc. In some embodiments, one or more related RPA scripts are bundled together with other files and/or metadata, to form RPA package 50. For instance, beside RPA scripts, RPA package 50 may comprise a specification of a resource required for executing the respective workflow(s). Exemplary resources include a location of a file (e.g., path, URL), a filename, and a set of credentials for accessing a particular machine, computer program, or service, among others. In what is commonly known in the art as a 'build', RPA scripts may be pre-compiled into a set of executable files which may include a main executable and accompanying libraries, resource specifications and metadata, to form RPA package 50. Package 50 may use any data specification format known in the art. For instance, some embodiments of package 50 comprise a NuGet package of NET assembly files.

A skilled artisan will appreciate that RPA design application 40 may comprise multiple components/modules, which may execute on distinct physical machines. In one such example illustrating a cloud computing embodiment of the present invention, RPA design application 40 may execute in a client-server configuration, wherein one component of application 40 may expose an automation design interface on the developer's computer, and another component of application 40 executing on a remote server may assemble the workflow and formulate/output RPA package 50. For instance, a developer may access the automation design interface via a web browser executing on the developer's computer, while the software processing the user input received at the developer's computer actually executes on the server.

In some embodiments, a workflow designed in RPA design application 40 is deployed to an RPA conductor 24, for instance in the form of an RPA package as described above. Per the above, in some embodiments, conductor 24 may be part of hyper-automation core system 30 illustrated in FIG. 1. One commercial example of conductor 24 is UiPath Orchestrator™.

Conductor 24 orchestrates one or more RPA robots 22 that execute the respective workflow. Such 'orchestration' may include creating, monitoring, and deploying computing resources for robots 22 in an environment such as a cloud computing system and/or a local computer. Orchestration may further comprise, among others, deployment, configuration, queueing, monitoring, logging of robots 22, and/or providing interconnectivity for robots 22. Provisioning may include creating and maintaining connections between robots 22 and conductor 24. Deployment may include ensuring the correct delivery of software (e.g, RPA packages 50, individual workflow specifications) to robots 22 for execution. Configuration may include maintenance and delivery of robot environments and workflow configurations. Queueing may include providing management of job queues and queue items. Monitoring may include keeping track of robot state and maintaining user permissions. Logging may include storing and indexing logs to a database and/or another storage mechanism (e.g., SQL, ElasticSearch®, Redis®). Conductor 24 may further act as a centralized point of communication for third-party solutions and/or applications.

RPA robots 22 are execution agents (e.g., computer programs) that implement automation workflows targeting various systems and applications including, but not limited to, mainframes, web applications, virtual machines, enterprise applications (e.g., those produced by SAP®, SalesForce®, Oracle®, etc.), desktop and laptop applications, mobile device applications, wearable computer applications, etc. One commercial example of robot 22 is UiPath Robots™. Types of robots may include attended robots 122, unattended robots 222, development robots (similar to unattended robots, but used for development and testing purposes), and nonproduction robots (similar to attended robots, but used for development and testing purposes), among others.

Some activities of attended robots 122 are triggered by user events and/or commands and operate alongside a human operator on the same computing system. In some embodiments, attended robots 122 can only be started from a robot tray or from a command prompt and thus cannot be entirely controlled by conductor 24 and cannot run under a locked screen, for example. Unattended robots may run unattended in remote virtual environments and may be responsible for remote execution, monitoring, scheduling, and providing support for work queues.

In some embodiments executing in a Windows® environment, robot 22 installs a Microsoft Windows® Service Control Manager (SCM)-managed service by default. As a result, such robots can open interactive Windows® sessions under the local system account and have the processor privilege of a Windows® service. For instance, a console application may be launched by a SCM-managed robot. In some embodiments, robot 22 may be installed at a user level of processor privilege (user mode, ring 3.) Such a robot has the same rights as the user under which the respective robot has been installed. For instance, such a robot may launch any application that the respective user can. On computing systems that support multiple interactive sessions running simultaneously (e.g., Windows® Server 2012), multiple robots may be running at the same time, each in a separate Windows® session, using different usernames.

In some embodiments, robots 22 are split into several components, each being dedicated to a particular automation task. The robot components in some embodiments include, but are not limited to, SCM-managed robot services, user-mode robot services, executors, agents, and command-line. Depending on platform details, SCM-managed and/or user-mode robot services manage and monitor Windows® sessions and act as a proxy between conductor 24 and the host machines (i.e., the computing systems on which robots 22 execute). These services are trusted with and manage the credentials for robots 22. The command line is a client of the service(s), a console application that can be used to launch jobs and display or otherwise process their output.

Figure 3:
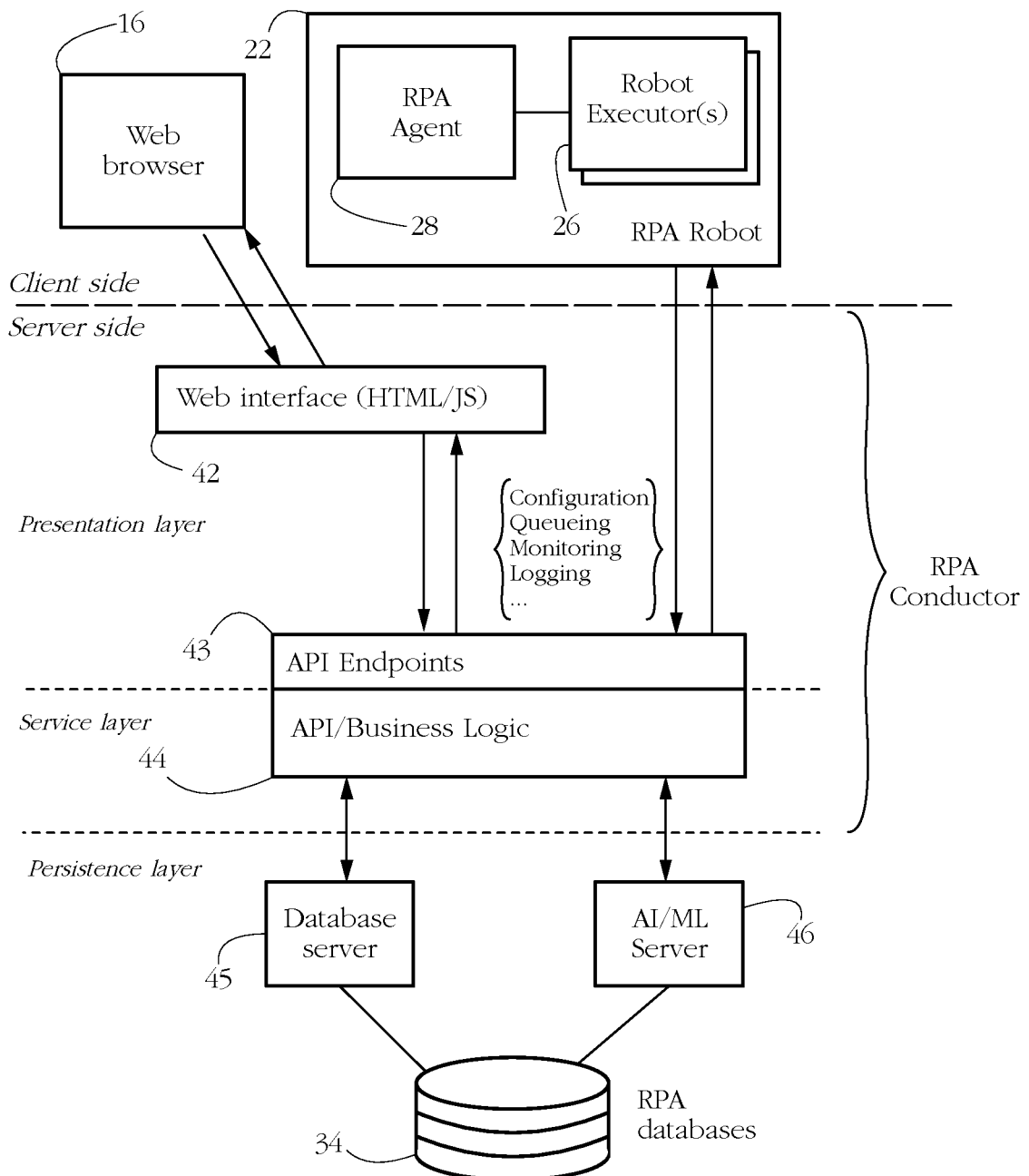
FIG. 3 shows an exemplary deployed RPA system executing in a client-server configuration according to some embodiments of the present invention.

An exemplary set of robot executors 26 and an RPA agent 28 are illustrated in FIG. 3. Robot executors 26 may run given jobs under a Windows® session. Executors 26 are configured to receive RPA package 50 specifying a workflow (e.g., sequence of robotic activities), and to execute the respective package which effectively amounts to carrying out the respective sequence of RPA activities. In some embodiments, package 50 comprises pre-compiled executable code. In other exemplary embodiments, robot executor(s) 26 comprise an interpreter (e.g., a just-in-time interpreter or compiler) configured to translate a received RPA script comprising a workflow specification (e.g., byte-code, XML, JSON etc.) into runtime code comprising processor instructions for carrying out the respective workflow. Executing RPA package 50 may thus comprise executor(s) 26 translating a workflow specification included in package 50 and instructing a processor of the respective host machine to load the resulting runtime code into memory and to launch the runtime code into execution.

RPA agent 28 may manage the operation of robot executor(s) 26. For instance, RPA agent 28 may select tasks/scripts for execution by robot executor(s) 26 according to an input from a human operator and/or according to a schedule. Agent 28 may start and stop jobs and configure various operational parameters of executor(s) 22. When robot 22 includes multiple executors 26, agent 28 may coordinate their activities and/or inter-process communication. RPA agent 28 may further manage communication between RPA robot 22 and conductor 24 and/or other entities.

Exemplary RPA system 20 in FIG. 2 forms a part of hyper-automation system 10 (see FIG. 1). As such, robots 22 may interact with various components and use various aspects of hyper-automation core system 30, illustrated generically as hyper-automation services 23 in FIG. 2. For instance, developers may use RPA design application 40 to build and test RPA robots 22 that utilize AI/ML models 36. Such RPA robots 22 may send input for execution of the AI/ML model(s) and receive output therefrom via hyper-automation core system 30. Robot 22 may be a listener, as described above. These listeners may provide information to core hyper-automation system 30 regarding what users are doing when they use their computing systems. This information may then be used by hyper-automation system 30 for process mining, task mining, task capture, etc. In another exemplary embodiment, hyper-automation services 23 may expose data labeling functionality to user of the computing system hosting robot 22 or to another computing system that robot 22 provides information to. For instance, if robot 22 calls a computer vision AI/ML model 36 but the respective model does not correctly identify a button on the screen, the user may explicitly provide a correct identification. Such information may be passed on to hyper-automation core system 30 and then used for re-training the respective AI/ML model.

In some embodiments, selected components of hyper-automation system 10 and/or RPA system 20 may execute in a client-server configuration. In one such configuration illustrated in FIG. 3, RPA robot 20 including executor(s) 26 and RPA agent 28 may execute on a client side, for instance on one of RPA client computers 12a-c in FIG. 1. In turn, the functionality of conductor 24 and/or other services of hyper-automation core system 30 may be implemented on the server side, e.g., on remote RPA servers 32 (FIG. 1). It should be noted that the client side, the server side, or both, may include any desired number of computing systems (e.g., physical or virtual machines) without deviating from the scope of the invention. The illustrated RPA system may be cloud-based, on-premises, or a combination thereof, offering enterprise-level, user-level, or device-level automation solutions for automation of different work processes.

Robot 22 may run several jobs/workflows concurrently. RPA agent 28 (e.g., a Windows® service) may act as a single client-side point of contact of multiple executors 26. Agent 28 may further manage communication between robot 22 and conductor 24. In some embodiments, communication is initiated by RPA agent 28, which may open a WebSocket channel to conductor 24. Agent 28 may subsequently use the channel to transmit notifications regarding the state of each executor 26 to conductor 24, for instance as a heartbeat signal. In turn, conductor 24 may use the channel to transmit acknowledgements, job requests, and other data such as RPA packages 50 to robot 22.

In one embodiment as illustrated in FIG. 3, conductor 24 includes a web interface 42 and a set of service modules comprising a set of Application Programming Interface (API) endpoints 43 and service APIs/business logic 44. A user may interact with conductor 24 via web interface 42 (e.g., by opening a dedicated web page on a browser 16), to instruct conductor 24 to carry out actions such as scheduling and/or starting jobs on robot 22, creating robot groups/pools, assigning workflows to robots, adding/removing data to/from queues, analyzing logs per robot or workflow, etc. Interface 42 may be implemented using Hypertext Markup Language (HTML), JavaScript (JS), or any other data format known in the art.

Conductor 24 may carry out actions requested by the user by selectively calling service APIs/business logic 44 via endpoints 43. In addition, some embodiments use API endpoints 43 to communicate between RPA robot 22 and conductor 24, for tasks such as configuration, logging, deployment, monitoring, and queueing, among others. API endpoints 43 may be set up using any data format and/or communication protocol known in the art. For instance, API endpoints 43 may be Representational State Transfer (REST) and/or Open Data Protocol (OData) compliant.

Configuration endpoints may be used to define and configure application users, permissions, robots, assets, releases, etc. Logging endpoints may be used to log different information, such as errors, explicit messages sent by robot 22, and other environment-specific information. Deployment endpoints may be used by robot 22 to query the version of RPA package 50 to be executed. Queueing endpoints may be responsible for queues and queue item management, such as adding data to a queue, obtaining a transaction from the queue, setting the status of a transaction, etc. Monitoring endpoints may monitor the execution of web interface 42 and/or RPA agent 28.

Service APIs 44 comprise computer programs accessed/called through configuration of an appropriate API access path, e.g., based on whether conductor 24 and an overall hyper-automation system have an on-premises deployment type or a cloud-based deployment type. Exemplary APIs 44 provide custom methods for querying stats about various entities registered with conductor 24. Each logical resource may be an OData entity in some embodiments. In such an entity, components such as a robot, process, queue, etc., may have properties, relationships, and operations. APIs 44 may be consumed by web application 42 and/or RPA agent 28 by getting the appropriate API access information from conductor 24, or by registering an external application to use the OAuth flow mechanism.

In some embodiments, a persistence layer of server-side operations implements a database service. A database server 45 may be configured to selectively store and/or retrieve data to/from RPA databases 34. Database server 45 and database 34 may employ any data storage protocol and format known in the art, such as structured query language (SQL), ElasticSearch®, and Redis®, among others. Exemplary data stored/retrieved by server 45 may include configuration parameters of robots 22 and robot pools, as well as data characterizing workflows executed by robots 22, data characterizing users, roles, schedules, queues, etc. In some embodiments, such information is managed via web interface 42. Another exemplary category of data stored and/or retrieved by database server 45 includes data characterizing the current state of each executing robot, as well as messages logged by robots during execution. Such data may be transmitted by robots 22 via API endpoints 43 and centrally managed by conductor 24, for instance via API logic 44.

Server 45 and database 34 also store/manage process mining, task mining, and/or task capture-related data, for instance received from listener modules executing on the client side as described above. In one such example, listeners may record user actions performed on their local hosts (e.g., clicks, typed characters, locations, applications, active elements, times, etc.) and then convert these into a suitable format to be provided to and stored in database 34.

In some embodiments, a dedicated AI/ML server 46 facilitates incorporation of AI/ML models 36 into automations. Pre-built AI/ML models, model templates, and various deployment options may make such functionality accessible even to operators who lack advanced or specialized AI/ML knowledge. Deployed robots 22 may call AI/ML models 36 by interfacing with AI/ML server 46. Performance of the deployed AI/ML models 36 may be monitored and the respective models may be re-trained and improved using human-validated data. AI/ML server 46 may schedule and execute training jobs and manage training corpora. AI/ML server 46 may further manage data pertaining to AI/ML models 36, document understanding technologies and frameworks, algorithms and software packages for various AI/ML capabilities including, but not limited to, intent analysis, natural language processing (NLP), speech analysis and synthesis, computer vision, etc.

Figure 4:
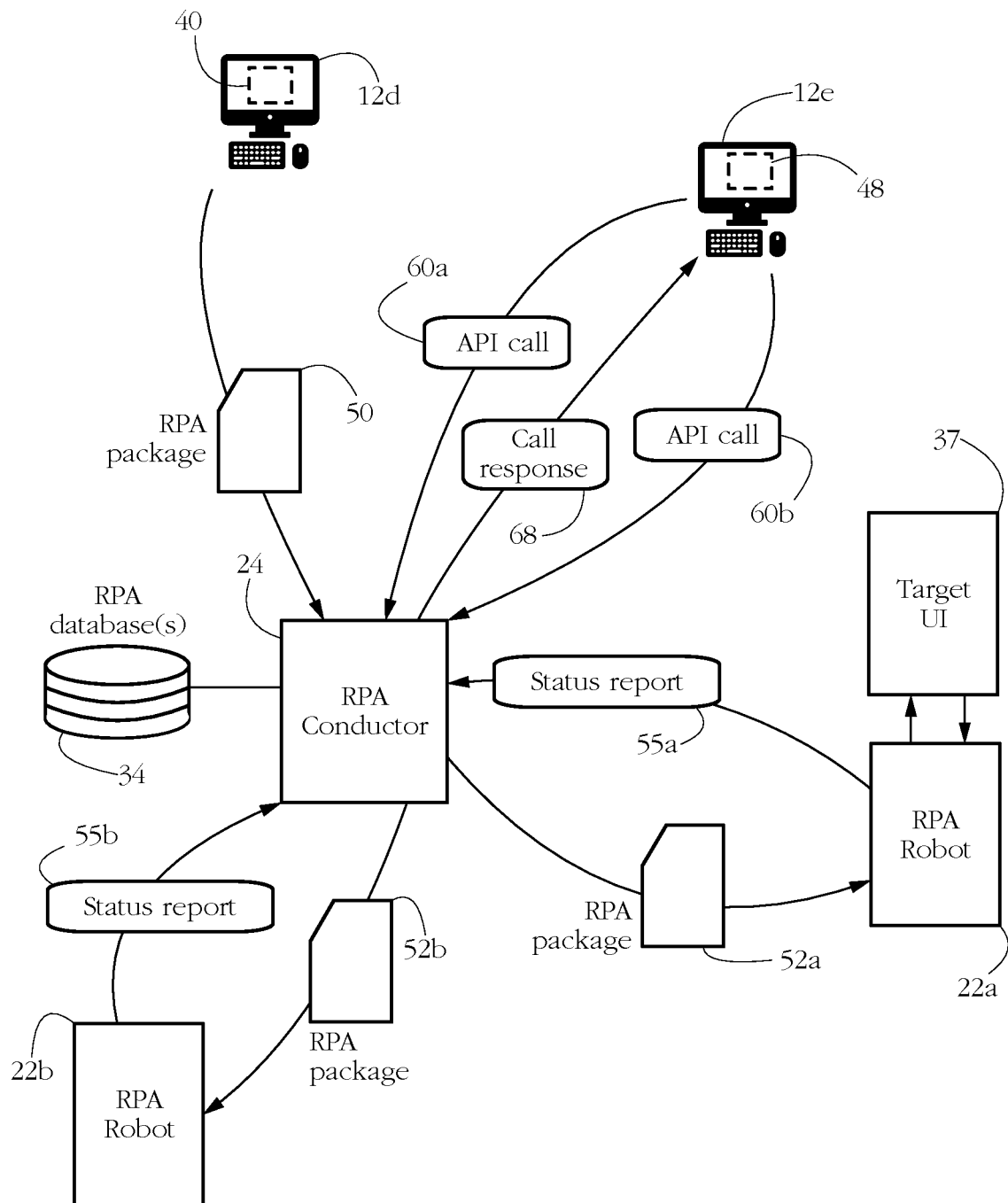
FIG. 4 illustrates an exemplary data exchange between an RPA conductor and RPA clients according to some embodiments of the present invention.

FIG. 4 shows an exemplary data exchange between RPA conductor 24, a set of RPA robots 22a-b, and a set of RPA clients 12d-e according to some embodiments of the present invention. In one exemplary use-case scenario as illustrated, a company employs an enterprise resource planning (ERP) system to manage various business aspects such as payroll, sales, and production, among others. Users may interact with the respective ERP system via a user interface, illustrated as a target UI 37 in FIG. 4. For instance, target UI 37 may expose a set of forms enabling the user to edit customer data, view and process invoices, etc. However, the present scenario assumes that target UI 37 is only accessible from a specific location. For instance, target UI 37 may only be exposed by a desktop application executing on an on-premises computer. Furthermore, the respective ERP system may rely on legacy software, so extending its functionality may be impractical. Some embodiments of the present invention mitigate such restrictions by making some of the functionality of target UI 37 accessible via direct API calls to RPA conductor 24 and/or robots 22a-b. For instance, an RPA client 12e may execute a client application 48 configured to interact with target UI 37 to extract and/or to input data from/into the respective ERP. However, since client 12e may not have access to target UI 37 directly, such interaction may be carried out by RPA robots 22a-b instructed via carefully formulated API calls addressed to an RPA conductor that manages execution of the respective API robots. In one such example, application 48 may expose a web form enabling the user to input customer data such as a name and an email address, and in response, to formulate an API call instructing conductor 24 to execute an RPA robot configured to input the respective data into target UI 37.

Figure 5:
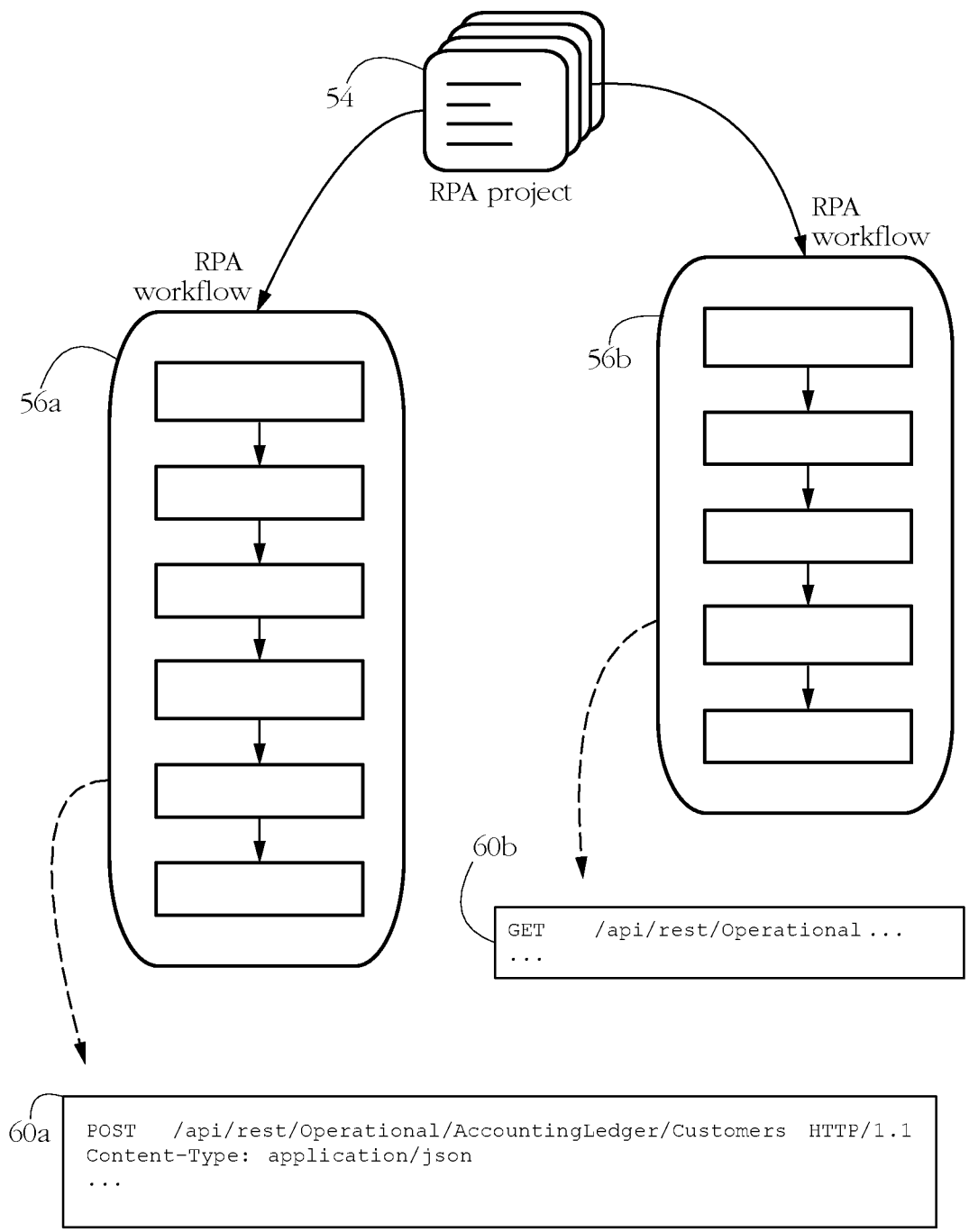
FIG. 5 illustrates an exemplary RPA project comprising multiple RPA workflows and workflow fragments according to some embodiments of the present invention.

In some embodiments per the illustrated scenario, an RPA developer uses an instance of RPA design application 40 to design various automations for interacting with target UI 37, for instance to automatically fill in forms or to issue queries to the respective ERP via target UI 37. Multiple related workflows may be grouped together within the same RPA project. FIG. 5 shows such an exemplary RPA project 54 comprising individual workflows 56a and 56b. In one example, workflow 56a may comprise a set of robotic activities for managing customer data, while workflow 56b may comprise another set of robotic activities for managing invoices. Some workflows 56a-b may be configured to have a set of input argument values and/or a set of output arguments. In one such example wherein workflow 56a is tasked with entering customer data into a form exposed by target UI 37, input arguments may include a personal name, company name, and email address of a customer, while output arguments may include a customer number returned by target UI 37 in response to a successful creation of a new database entry for the respective customer. An artisan will understand that while FIG. 5 shows just two workflows 56a-b, this aspect is not meant to be limiting. Project 54 may include many more, e.g., dozens of related RPA workflows.

RPA design application 40 may export the respective RPA project as RPA package 50 comprising computer-readable specifications of RPA workflows included in the respective project, together with a specification of resources used by the respective workflows, as described above in relation to FIG. 2. RPA client 12d may then upload RPA package 50 to RPA conductor 24, which may execute on a remote RPA server 32 as described above.

In some embodiments, some workflows 56a-b are specifically configured to be invoked selectively and individually via workflow-specific API calls issued to RPA conductor 24, as further described below. FIGS. 4-5 illustrate exemplary API calls 60a-b for invoking workflows 56a-b, respectively. Such API calls may be issued by virtually any computer system, including RPA client 12d involved in designing the respective workflow fragments. In the exemplary scenario in FIG. 4, API calls 60a-b are issued by client application 48 executing on RPA client 12e.

In some embodiments, receiving API call 60a will cause RPA conductor 24 to selectively trigger the execution of workflow 56a. Such selective execution is herein meant to indicate that the respective workflow will be executed separately and independently from other workflows described in RPA package 50. Similarly, API call 60b will cause conductor 24 to selectively trigger execution of workflow 56b independently of other workflows included in package 50.

In some embodiments, such selective execution is achieved by including an identity token in each API call, the identity token distinguishing the respective workflow from other workflows of the respective RPA project. Exemplary identity tokens include a workflow name and a workflow location (e.g., position within a user-defined folder hierarchy associated with the respective RPA project, a path or network address of a file comprising a specification of the respective workflow, etc.), among others. Some embodiments enable a user of RPA design application to customize the identity token.

API calls 60a-b may take any form known in the art. In general, an API call comprises a set of API call parameters, which herein may encompass both operators and operands/arguments of the respective call. In some embodiments, an identity token associated with a workflow is included as an API call parameter value within the API call. API call parameter values may be included in the specification of each workflow (e.g., RPA package 50), for instance as a set of metadata.

FIG. 6 illustrates an exemplary API call 60 embodied as a hypertext transfer protocol (HTTP) request. A skilled artisan will know that the present description extends to other types and formats of API call. Exemplary API call parameters of call 60 include a call method 61, a call uniform resource identifier (URI) 63, and a set of input arguments 65, among others. Exemplary values of an HTTP call method 61 include POST, GET, PUT, and DELETE, among others, corresponding to various manners of interpreting and processing the respective call at the receiving end. For instance, GET requests are generally used for retrieving data from a server, while POST requests are used for sending data to a server. URI 63 may work as an identity token for the respective workflow, and therefore may be deliberately formulated to be workflow-specific. Exemplary URIs 63 include a uniform resource locator (URL) and a uniform resource name (URN), among others. A URL may indicate, for instance, a network address or Internet domain name where the respective API call should be directed. However, to work as a token indicator, the respective URL may include at least a fragment that is specific to the respective workflow. Input arguments 65 comprise input arguments of the RPA workflow invoked via API call 60. The type of input arguments 65 depends on the purpose of the respective workflow and/or on a type of activities included in the respective workflow. In the example of FIG. 6, the workflow being invoked by API call 60 may create a new database entry (e.g., register a new customer) with the shown characteristics, by entering arguments 65 into a set of form fields exposed by target UI 37. The formatting of input arguments 65 may vary, but an artisan will know that this aspect is not meant to be limiting. In the given example, arguments 65 are formulated in JSON, but they might as well have been represented as a string of concatenated attribute-value pairs (form-urlencoded), as an XML expression, etc. API call 60 may also include other call parameters as illustrated, specifying for instance a domain name of a host computer (e.g., an RPA server 32), a type of connection, etc.

In some embodiments, in response to receiving RPA package 50, conductor 24 identifies individual workflows included in package 50 and configures a set of robots 22a-b to selectively execute the respective workflows. For instance, for each workflow, conductor 24 may provision a specification of the respective workflow to a selected RPA robot (see e.g., illustrated RPA packages 52a-b in FIG. 4). RPA conductor 24 may further create an association between each workflow, a respective set of API call parameter values (e.g., workflow-specific URI 63, see FIG. 6), and the RPA robot configured to execute the respective workflow. Following such association, and in response to receiving API call 60a-b, RPA conductor 24 may selectively relay call arguments to the appropriate RPA robot and trigger its execution. Any output of the execution may be transmitted to orchestrator 24 as part of a status report 55a-b, and further relayed to the calling entity (e.g., a call response 68). The operation of conductor 24 is further detailed below in response to FIGS. 10-11.

Figure 8:
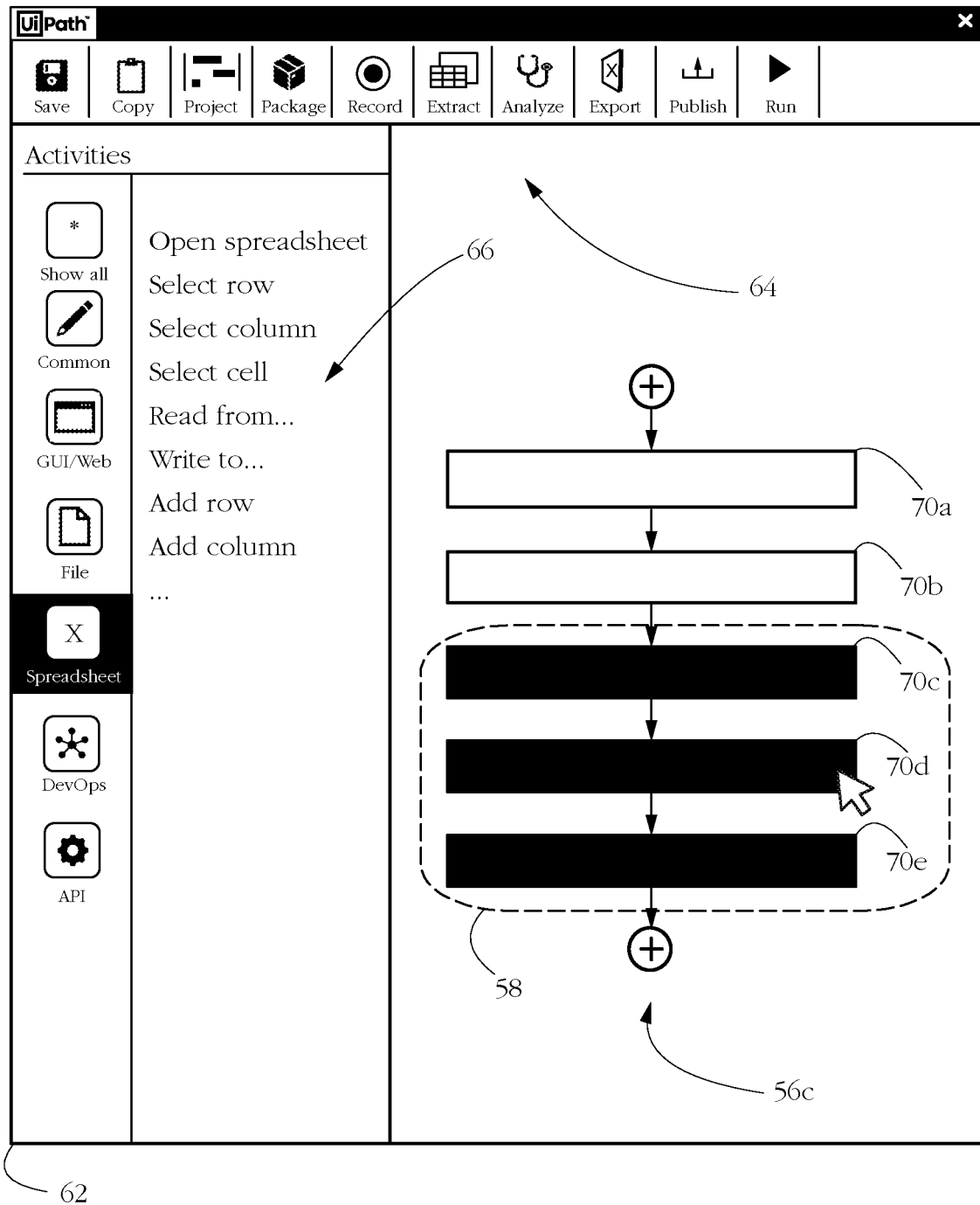
FIG. 8 shows an exemplary set of workflow design tools exposed by an RPA design interface according to some embodiments of the present invention.

FIG. 7 shows an exemplary sequence of steps performed by the RPA design application according to some embodiments of the present invention. A step 702 exposes an RPA design interface, for instance an exemplary interface 62 as illustrated in FIG. 8. Design interface 62 may comprise a main menu/ribbon 64 including a plurality of menu items enabling a user to manage complex RPA projects including multiple workflows. Ribbon 64 may comprise, for instance, individual controls for opening, saving, analyzing, testing, exporting, and executing a selected workflow, and recording a set of actions to be replayed by an RPA robot. Other menu items may invoke project-level functionality such as organizing workflows into folders, managing project metadata, etc.

A step 704 receives a user input selecting a workflow from a plurality of user-configured workflows of a current RPA project. Step 704 may be achieved in various ways, for instance by selecting a previously-created workflow from a menu/list or a collection of icons, or by creating a new workflow from scratch. In yet another exemplary manner of selecting a workflow illustrated in FIG. 8, a user may select a workflow fragment 58 from an existing workflow 56c and save fragment 58 as a separate workflow within the current RPA project. To select fragment 58, the user may for instance click a set of parts of the parent workflow, use a pointer to draw a line enclosing the selected workflow parts, etc.

In a sequence of steps 706-708, RPA design interface may display a visual diagram of the selected workflow and receive user input defining and customizing the selected workflow. Some embodiments enable a user to design automations by way of intuitive visual and/or drag-and-drop tools, instead of coding per se. For instance, interface 62 may enable the user to assemble a desired workflow from a set of individual building blocks arranged in sequence. Such building blocks may comprise individual RPA activities, such as opening an instance of an application (e.g., web browser), clicking on a UI element (e.g., button), filling out a form field, etc. The granularity of such individual building blocks may vary and may be controlled by the user. For instance, some RPA activities may themselves consist of subsequences of other RPA activities. As such, interface 62 may enable the user to group several activities into a new building block/RPA activity.

Design interface 62 may further expose an activity menu 66 listing a plurality of available activities for building RPA workflows. In some embodiments, activity menu 66 may enable the user to access/use a broad variety of robotic activities, including GUI activities, browser activities, mail activities, spreadsheet activities, file activities, API activities, activities for interacting with various software platforms and services such as SAP™, and AI/ML activities, among others. Exemplary GUI activities may comprise activities for interacting with a GUI, such as identifying various GUI elements (text, images, and controls), clicking a button, executing a screen gesture (pinching, swiping, etc.), filling in a form field, and scraping/copying data from a GUI, among others. Exemplary browser activities may include opening a browser window and navigating to a selected URL. Mail activities may include activities for sending and receiving electronic communications (e.g., email, instant messaging, etc.). Spreadsheet activities may include selecting spreadsheet cells according to various criteria, copying a content of a selected cell, and entering data into a selected cell, among others. File activities may include, for instance, accessing various local or network addresses, downloading, uploading, opening, editing, and deleting files. API activities may include calling various pre-defined external APIs. Exemplary AI/ML activities may include computer vision-related activities such as text and/or image recognition, among others.

For convenience, activity menu 66 may be organized into a hierarchy of submenus. In the example of FIG. 8, available activities are organized into submenus according to various criteria, such as a type of target application (e.g., activities for interacting with GUIs are grouped together into a submenu, while activities for interacting with a spreadsheet are grouped into another submenu). Other exemplary grouping criteria may include a type of target object: file-related activities may be grouped together into a submenu, while image-related activities may be grouped into another submenu. A skilled artisan will know that such groupings are given only as examples and are not meant to be limiting.

A workflow diagram displayed by interface 62 may comprise a visual representation of a selected workflow 56c as a set of already selected robot activities arranged in sequence according to a desired order of execution of the respective activities. In the example of FIG. 8, individual activities are represented by activity containers 70a-e connected by arrows in the manner of a computer flowchart. In some embodiments, step 708 may comprise the user accessing an individual activity by clicking inside the respective activity container 70a-e. In response to detecting such a click, RPA design application 40 may expose an activity configuration interface enabling the user to configure various activity-specific parameters, such as an activity type (e.g., selectable from activity menu 66), name, input and/or output arguments, etc. In some embodiments, interface 62 may further enable the user to insert, delete, and change the order of containers 70a-e, for instance using drag-and-drop manipulations. A user may further group multiple selected activities/containers together, to form a composite activity represented by its own container with a name, visual style, and configuration options. Such a container may for instance be represented as a box drawn around the selected member activities/containers.

Figure 9:
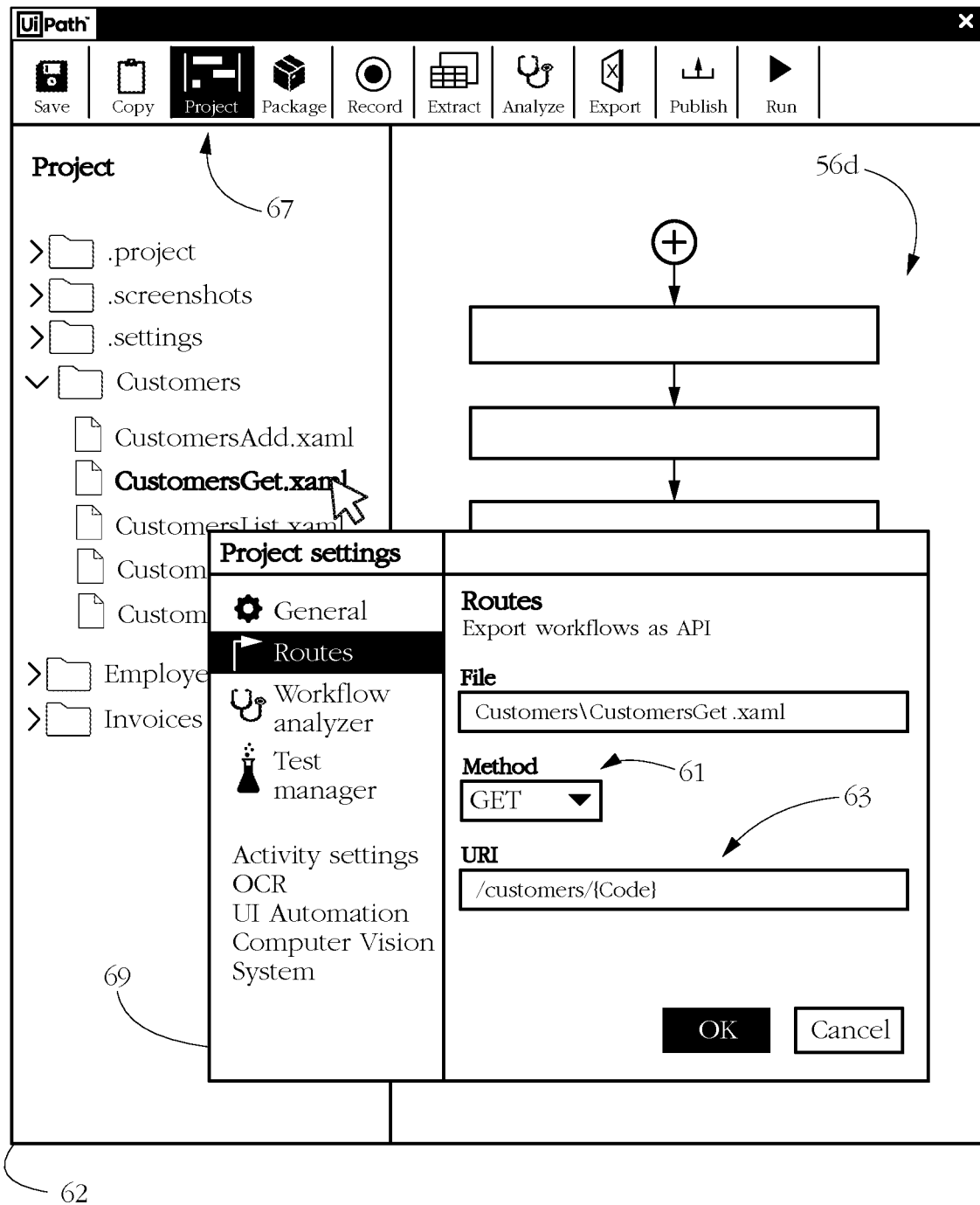
FIG. 9 shows a call configuration interface exposed by the RPA design interface according to some embodiments of the present invention.

As part of designing and configuring an RPA workflow, in a step 712 some embodiments expose an API call configuration interface, for instance in respect to the user clicking a dedicated control or menu item. FIG. 9 illustrates another exemplary view displayed by RPA design interface 62, including an exemplary API call configuration interface 69 that may be exposed, for instance, by clicking a ribbon icon 67 and selecting the respective workflow's name ('CustomersGet.xaml', in the current example) from a list of available workflows displayed in a left pane of interface 62.

In some embodiments, call configuration interface 69 enables the user to define workflow-specific values of API call parameters such as method 61 and URI 63 (see also FIG. 6), among others. In some embodiments, the indicated call parameter values are later used by RPA conductor 24 to identify and selectively trigger execution of the respective workflow in response to a received API call. Stated otherwise, an API call having the respective parameter values will cause conductor 24 to selectively trigger execution of the respective workflow, as further detailed below. Upon displaying call configuration interface 69, some embodiments automatically suggest some parameter values, such as the API method (e.g., POST, GET, etc.). Such suggestions may be determined by RPA design application 40 according to a type of RPA activities included in the respective workflow fragment. Similarly, a URI parameter value may be determined according to a name of the respective workflow fragment, according to a position of the respective workflow fragment within a folder hierarchy of the current project, or may be configured deliberately to avoid collisions (i.e., coincidentally having two distinct fragments with the same URI). The user may accept the suggested values or customize them (a step 714).

In response to successfully configuring API call parameters (a step 716 returns a YES), RPA design application 40 may receive a user input indicating an intention to export the current RPA project to RPA conductor 24. For instance, to export RPA package 50, the user may click an 'Export' button or menu item. In response to an export request (a step 718 returns a YES), in a step 720 some embodiments generate RPA package 50 and transmit package 50 to RPA conductor 24. Package 50 includes a specification (e.g., RPA scripts) of workflows forming a part of the current RPA project, and may further include resource specifications and/or metadata as described above. In some embodiments, any API call parameter values displayed by and/or entered into call configuration interface 69 in relation to a workflow are uniquely associated with the respective workflow and are included into RPA package 50 and/or otherwise transmitted to RPA conductor 24. Such call parameters may be encoded for instance as metadata accompanying a specification of a respective workflow.

Figure 10:
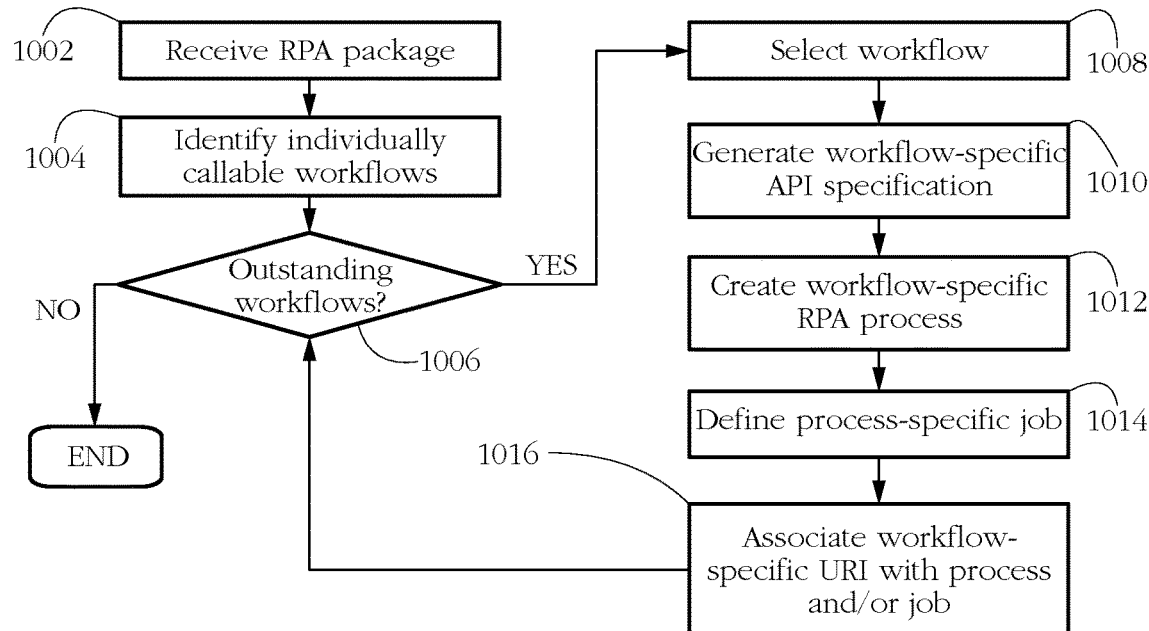
FIG. 10 shows an exemplary sequence of steps performed by the RPA conductor according to some embodiments of the present invention.

FIG. 10 shows an exemplary sequence of steps carried out by RPA conductor 24 according to some embodiments of the present invention. In response to receiving RPA package 50 (a step 1002), in a step 1004 conductor 24 may identify API-callable workflows included in package 50. For each workflow described in package 50, an exemplary embodiment may determine whether the respective workflow is individually invokable via API calls according to whether the specification of the respective workflow includes API call parameter values. Such parameter values may be encoded as metadata associated with the respective workflow. Next, for each such callable workflow (a step 1006 returns a YES), conductor 24 may loop through a sequence of steps 1008-1016, as illustrated.

In a step 1010, some embodiments may analyze the respective workflow and automatically generate an API specification for the respective workflow. The API specification may provide guidance for a developer wishing to invoke the respective RPA workflow via API calls. As such, the API specification may include a description of the functionality of the respective workflow, a description of an input and/or output of the respective workflow, a data type and formatting of various operational parameters and/or arguments, information about authentication methods, license, terms of use, contact information, etc. The API specification may further provide sample API calls usable to invoke the respective workflow under various conditions and scenarios. To generate the API specification, some embodiments rely on data included in RPA package 50, for instance workflow-specific API call parameter values (e.g., call method and call URI) entered by a user of RPA design application 40 as described above. The format and content of the API specification may vary; some embodiments generate OpenAPI or Swagger™-compliant specifications. Step 1010 may further make the respective API specification available, e.g., enable a mechanism of transmitting API specification data to an inquiring entity in response to a particular form of API call received from the respective entity.

In a step 1012, RPA conductor 24 may define an RPA process for the respective workflow. An RPA process according to some embodiments effectively comprises an association between the respective workflow and a specific instance of RPA robot (see e.g., robots 22*a-b* in FIG. 4), so that the respective robot is tasked with executing the respective workflow. Step 1012 may comprise assigning computer resources to the respective robot (e.g., instantiating a virtual machine on a cloud computing environment, instantiating the robot and supporting software, connecting the robot with conductor 24, etc.) and deploying a specification of the respective workflow to the respective RPA robot (see e.g., RPA packages 52*a-b* in FIG. 4). A further step 1014 may create an RPA job comprising an instance of executing the respective workflow on the selected RPA robot. In some embodiments, the respective RPA job is triggered by an incoming API call, as further described below.

Instead of defining workflow-specific RPA processes and/or jobs (steps 1012-1014), an alternative embodiment may define a single RPA process associated with multiple workflows, e.g., with the entire RPA package 50. Defining such a process may effectively amount to identifying, reserving and/or allocating computing resources (e.g., robots 22*a-b* in FIG. 4) for executing any workflow of the respective package.

In a further step 1016, some embodiments create an association between workflow-specific API call parameter values (e.g., URI) and the RPA process and/or job defined in steps 1012-1014 above. Such associations enable conductor 24 to identify which workflow, process, and/or job to execute in response to receiving an API call.

Associations between workflows, RPA jobs, and RPA robots may be achieved using any method known in the art. For instance, conductor 24 may maintain a ledger of RPA processes and/or jobs by adding, updating, and deleting processes and/or jobs via specific service APIs 44 and calls to database server 45. Each process and job may be represented by a separate entry in RPA database(s) 34. In some embodiments, a set of API call parameter values (e.g., call URI 63) may be used to calculate a hash index for looking up an associated RPA process and/or job into RPA database(s) 34.

Figure 11:
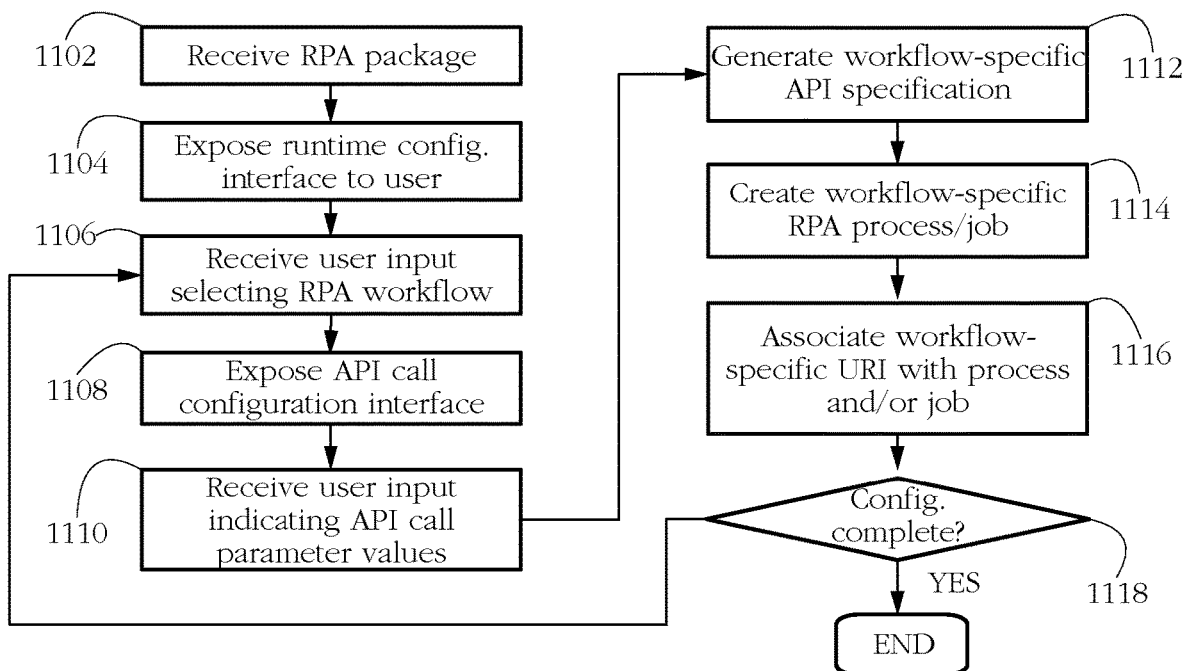
FIG. 11 shows an alternative exemplary sequence of steps performed by the RPA conductor according to some embodiments of the present invention.

The description above focused on exemplary embodiments enabling a user to configure workflow-specific API call parameters at design time, e.g., via an API call configuration interface exposed by RPA design application 40 (FIG. 9). An alternative embodiment may allow a user to set the respective call parameters via a user interface exposed by RPA conductor 24. FIG. 11 illustrates an exemplary sequence of steps performed by conductor 24 in such an alternative embodiment. In response to receiving package 50 (a step 1102), a step 1104 may expose a runtime configuration interface to the user. Among others, the runtime configuration interface may enable the user to configure various runtime parameters such as defining RPA processes and jobs, scheduling execution of various RPA workflows, managing robot fleets and other computing resources, etc. The runtime configuration interface may display to the user a content of RPA package 50, for instance display a list of RPA workflows included in package 50 and a set of controls for configuring various aspects of the respective workflows.

In a step 1106, conductor 24 may receive a user input selecting an RPA workflow for configuration from the respective package. In response, a step 1108 may expose an API call configuration interface enabling the user to set parameters of an API call usable to selectively invoke an execution of the respective RPA workflow. The look and functionality of the exposed call configuration interface may be similar to those of interface 69 described above in relation to FIG. 9. A step 1110 may display to and/or receive from the user a set of call parameter values such as method 61 and URI 63, among others. In response to the user's validating a set of API call parameter values specific to the respective RPA workflow, a sequence of steps 1112-1114-1116 may generate a workflow-specific API specification, define workflow-specific RPA processes/jobs, and associate such processes/jobs with the respective selected workflow and/or API call parameter values. For details, please see description above related to steps 1010-1016 in FIG. 10. The API call configuration sequence above may be repeated in response to a user's selecting another RPA workflow from package 50.

Figure 12:
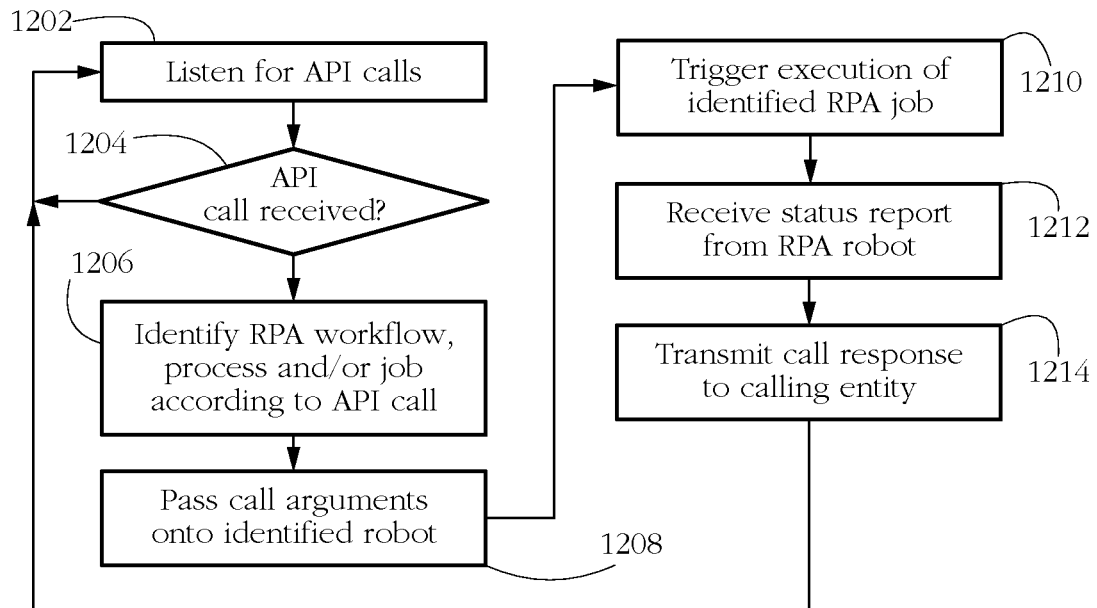
FIG. 12 shows another exemplary sequence of steps performed by the RPA conductor according to some embodiments of the present invention.

FIG. 12 shows another exemplary sequence of steps performed by RPA conductor 24 according to some embodiments of the present invention. A sequence of steps 1202-1204 listens for API calls, for instance on a specific port of an RPA server computer system forming a part of conductor 24. In response to receiving an API call, a step 1206 may identify an RPA workflow, process and/or job according to the respective API call. For instance, some embodiments may identify an RPA workflow, process and/or job according to a selected call parameter value (e.g., call URI 63) or according to a combination of call parameter values of the received API call, using a workflow-to-process or workflow-to-job association as described above in relation to FIG. 10.

A sequence of steps 1208-1210 may pass any call arguments 65 included in the respective API call (see e.g., FIG. 6) onto the RPA robot identified in step 1206, and trigger execution of the respective job. In some embodiments, in a further step 1212 the RPA robot may send a status report back to RPA conductor 24 (see e.g., reports 55*a-b* in FIG. 4), the status report indicating for instance whether the respective job executed successfully, and otherwise including a set of error codes indicative of a reason for failure. When the workflow executed by the respective RPA job is configured to return a set of output arguments, values of such output arguments may be included in status report 55*a-b*. A further step 1214 may transmit a call response 68 (FIG. 4) back to the sender of the respective API call, and return to listening for API calls. Call response 68 may include any workflow output argument values received from the RPA robot.

Figure 13:
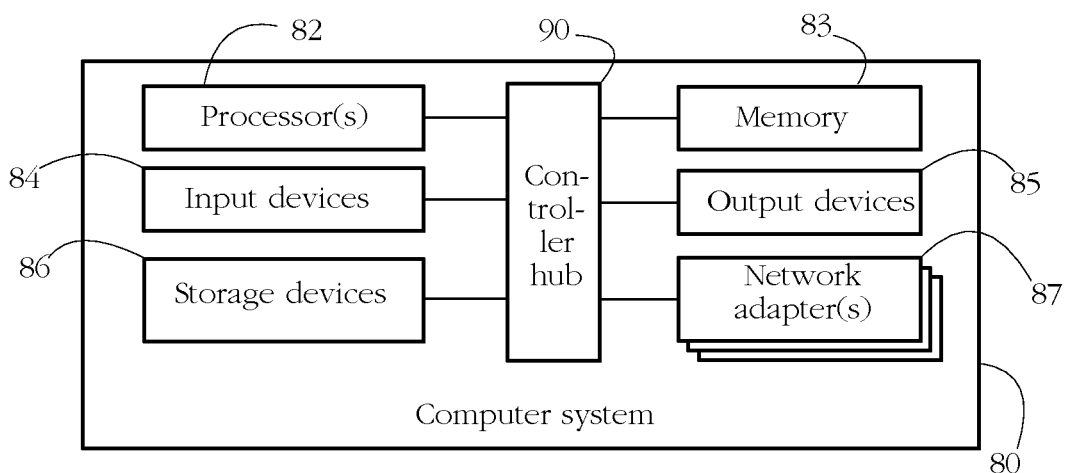
FIG. 13 shows an exemplary hardware configuration of a computer system programmed to execute some of the methods described herein.

FIG. 13 shows an exemplary hardware configuration of a computer system 80 programmed to execute some of the methods described herein. Computer system 80 may represent any of RPA clients 12*a-e*, as well as RPA server(s) 32. The illustrated appliance is a personal computer; other computer systems such as servers, mobile telephones, tablet computers, and wearable computing devices may have slightly different configurations. Processor(s) 82 comprise a physical device (e.g. microprocessor, multi-core integrated circuit formed on a semiconductor substrate) configured to execute computational and/or logical operations with a set of signals and/or data. Such signals or data may be encoded and delivered to processor(s) 82 in the form of processor instructions, e.g., machine code. Processor(s) 82 may include a central processing unit (CPU) and/or an array of graphics processing units (GPU).

Memory unit 83 may comprise volatile computer-readable media (e.g. dynamic random-access memory—DRAM) storing data and/or instruction encodings accessed or generated by processor(s) 82 in the course of carrying out operations. Input devices 84 may include computer keyboards, mice, trackpads, and microphones, among others, including the respective hardware interfaces and/or adapters allowing a user to introduce data and/or instructions into computer system 80. Output devices 85 may include display devices such as monitors and speakers among others, as well as hardware interfaces/adapters such as graphic cards, enabling the respective computing device to communicate data to a user. In some embodiments, input and output devices 84-85 share a common piece of hardware (e.g., a touch screen). Storage devices 86 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 87 include mechanical, electrical, and signaling circuitry for communicating data over physical links coupled to an electronic communication network (e.g, FIG. 3) and/or to other devices/computer systems. Adapter(s) 87 may be configured to transmit and/or receive data using a variety of communication protocols.

Controller hub 90 generically represents the plurality of system, peripheral, and/or chipset buses, and/or all other circuitry enabling the communication between processor(s) 82 and the rest of the hardware components of computer system 80. For instance, controller hub 90 may comprise a memory controller, an input/output (I/O) controller, and an interrupt controller. Depending on hardware manufacturer, some such controllers may be incorporated into a single integrated circuit, and/or may be integrated with processor(s) 82. In another example, controller hub 90 may comprise a northbridge connecting processor 82 to memory 83, and/or a southbridge connecting processor 82 to devices 84, 85, 86, and 87.

The exemplary systems and methods described above facilitate the design and utilization of RPA systems. Some embodiments enable an RPA developer to define a sequence of RPA activities as a distinct entity whose execution may be invoked remotely via an API call (e.g., HTTP request) issued to an RPA conductor orchestrating a fleet of RPA robots. An RPA project may include multiple such RPA workflows, each selectively executable via a workflow-specific API call.

In conventional RPA systems, a project having multiple RPA workflows is typically accessed via a single entry point common to all the constituents of the project. Stated otherwise, a user cannot execute individual workflows directly, but only via a management interface exposed by the RPA conductor. In such conventional systems, the RPA conductor manages execution of various components according to an internal call system which is often proprietary, opaque to the end-user, and not open to external calls.

In contrast to such conventional RPA, some embodiments of the present invention open the RPA conductor system up to external calls by creating multiple entry points into a complex RPA project, so that a user can selectively trigger execution of virtually any component of an RPA project via an API call issued directly to the RPA conductor.

A particular use case scenario specifically targeted by some embodiments of the present invention comprises a situation wherein a company has to rely on legacy software (e.g., an on-premises ERP system) for various business aspects such as payroll, sales, production, etc. If the respective company needs to implement functionality which is currently not provided by the legacy software, such upgrades may be impossible or relatively costly to implement. One common solution to such problems is to develop new software that fulfills all the current requirements of the respective client. The new software may sometimes use some of the functionality of the legacy software, for instance by interacting with the latter via dedicated plugins. However, such plugins are not always available, or may not be suited to the client's needs.

Some embodiments of the present invention offer an alternative solution to such problems by using RPA and API calls as described herein. In one example, the client may develop an application (see e.g., client application 48 in FIG. 4) that extends the functionality of the existing ERP system by further manipulating an output of the legacy software. For instance, the new client application may employ the legacy software for managing the customer database, but then use the respective customer data in new ways. However, instead of directly invoking functions of the legacy software from within the client application (which may not be possible in the absence of an appropriate plugin or similar technology), some embodiments use an RPA robot to interact with the legacy software via its user interface, i.e., in the manner of a human user. Some embodiments allow developing a set of automations for interacting with the legacy user interface (e.g., target interface 37 in FIG. 4), for instance to input data into and/or extract data from the legacy software. The client application may then invoke the respective automations via API calls directly issued to a robot conductor that manages the execution of the RPA robot. The robot conductor may then relay a result of executing the respective automation back to the client application, which may further process the result as needed.

Another advantage of some embodiments of the present invention is the possibility of re-using automations across multiple calling entities. A selected workflow may be deployed and ready for execution on an RPA robot as described herein. The respective workflow may carry out an elementary operation such as creating a new customer database entry by entering the respective customer's data into a form exposed by a target UI. As per the description above, RPA conductor 24 may identify the respective automation according to call parameters of a received API call. However, the respective call may come from virtually any computer system and software application, allowing multiple applications to share the functionality of the respective workflow by issuing similar API calls to the RPA conductor.

Some embodiments enable a user to set the scope of an API-callable workflow with arbitrary granularity. For instance, a user may be able to select a fragment of an existing workflow and define fragment-specific API call parameters so that the respective fragment will be executed separately and independently of the rest of the parent workflow. An exemplary parent workflow may include activities for navigating to a target authentication webpage, entering a set of credentials for accessing a web service, selecting a specific form exposed by the respective web service, and entering a set of data into the respective web form. Some embodiments may allow a user to select for instance just the form-filling part of the parent workflow and define it as a separate entity capable of executing independently of other parts of the parent workflow and callable via an API call issued from virtually any client computer and software application. Such flexibility gives a user substantial freedom in using RPA for interacting with legacy software and services.

It will be clear to one skilled in the art that the above embodiments may be altered in many ways without departing from the scope of the invention. Accordingly, the scope of the invention should be determined by the following claims and their legal equivalents.

The invention claimed is:

1. A computer system comprising at least one hardware processor configured to execute a robotic process automation (RPA) design application configured to:
receive a user input choosing an RPA workflow for selective execution from a plurality of workflows of an RPA project, the RPA workflow comprising a user-defined sequence of robotic activities;
in response, formulate an RPA package comprising a specification of the plurality of workflows, the RPA package formulated to include metadata encoding a set of user-defined application programming interface (API) call parameter values for configuring an API call which, when received by an RPA conductor configured to coordinate a set of RPA robots, causes the RPA conductor to selectively trigger an execution of the RPA workflow by an RPA robot of the set of RPA robots; and
transmit the RPA package to the RPA conductor.

2. The computer system of claim 1, wherein the RPA design application is further configured to:
receive another user input choosing another RPA workflow for selective execution from the plurality of workflows of the RPA project; and
in response, formulate the RPA package to further include metadata encoding another set of user-defined API call parameter values for formulating another API call which, when received by the RPA conductor, causes the RPA conductor to selectively trigger an execution of the other RPA workflow by another RPA robot of the set of RPA robots.

3. The computer system of claim 1, wherein the set of user-defined API call parameter values includes a user-defined identity token distinguishing the RPA workflow from other workflows of the RPA project.

4. The computer system of claim 3, wherein the API call comprises a hypertext transfer protocol (HTTP) request and wherein the user-defined identity token comprises a uniform resource identifier (URI) of the RPA workflow.

5. The computer system of claim 1, wherein the RPA design application is further configured to expose a UI control enabling a user of the RPA design application to define the set of API call parameter values.

6. The computer system of claim 1, wherein the RPA workflow comprises a selected fragment of another workflow of the plurality of workflows of the RPA project.

7. The computer system of claim 1, wherein the RPA workflow is configured to receive an input argument value, wherein the API call includes the input argument value, and wherein receiving the API call causes the RPA conductor to relay the input argument value on to the RPA robot.

8. The computer system of claim 1, wherein the RPA workflow is configured to produce an output argument value, and wherein receiving the API call causes the RPA conductor to receive the output argument value from the RPA robot and to relay the output argument value on to a sender of the API call.

9. A method comprising employing at least one hardware processor of a computer system to execute a robotic process automation (RPA) design application, wherein executing the RPA design application comprises:
receiving a user input choosing an RPA workflow for selective execution from a plurality of workflows of an RPA project, the RPA workflow comprising a user-defined sequence of robotic activities;
in response, formulating an RPA package comprising a specification of the plurality of workflows, the RPA package formulated to include metadata encoding a set of user-defined application programming interface (API) call parameter values for configuring an API call which, when received by an RPA conductor configured to coordinate a set of RPA robots, causes the RPA conductor to selectively trigger an execution of the RPA workflow by an RPA robot of the set of RPA robots; and
transmitting the RPA package to the RPA conductor.

10. The method of claim 9, wherein executing the RPA design application further comprises:
receiving another user input choosing another RPA workflow for selective execution from the plurality of workflows of the RPA project; and
in response, formulating the RPA package to further include metadata encoding another set of user-defined API call parameter values for formulating another API call which, when received by the RPA conductor, causes the RPA conductor to selectively trigger an execution of the other RPA workflow by another RPA robot of the set of RPA robots.

11. The method of claim 9, wherein the set of user-defined API call parameter values includes a user-defined identity token distinguishing the RPA workflow from other workflows of the RPA project.

12. The method of claim 11, wherein the API call comprises a hypertext transfer protocol (HTTP) request and wherein the user-defined identity token comprises a uniform resource identifier (URI) of the RPA workflow.

13. The method of claim 9, wherein the RPA design application is further configured to expose a UI control enabling a user of the RPA design application to define the set of API call parameter values.

14. The method of claim 9, wherein the RPA workflow comprises a selected fragment of another workflow of the plurality of workflows of the RPA project.

15. The method of claim 9, wherein the RPA workflow is configured to receive an input argument value, wherein the API call includes the input argument value, and wherein receiving the API call causes the RPA conductor to relay the input argument value on to the RPA robot.

16. The method of claim 9, wherein the RPA workflow is configured to produce an output argument value, and wherein receiving the API call causes the RPA conductor to receive the output argument value from the RPA robot and to relay the output argument value on to a sender of the API call.

17. A non-transitory computer readable medium storing instructions which, when executed by at least one hardware processor of a computer system, cause the computer system to form a robotic process automation (RPA) design application configured to:
- receive a user input choosing an RPA workflow for selective execution from a plurality of workflows of an RPA project, the RPA workflow comprising a user-defined sequence of robotic activities;
- in response, formulate an RPA package comprising a specification of the plurality of workflows, the RPA package formulated to include metadata encoding a set of user-defined application programming interface (API) call parameter values for configuring an API call which, when received by an RPA conductor configured to coordinate a set of RPA robots, causes the RPA conductor to selectively trigger an execution of the RPA workflow by an RPA robot of the set of RPA robots; and
- transmit the RPA package to the RPA conductor.

* * * * *